United States Patent [19]
Foster, Jr.

[11] Patent Number: 5,668,929
[45] Date of Patent: Sep. 16, 1997

[54] SPEECH ACTIVATED SECURITY SYSTEMS AND METHODS

[75] Inventor: Richard W. Foster, Jr., Costa Mesa, Calif.

[73] Assignee: Hirsch Electronics Corporation, Irvine, Calif.

[21] Appl. No.: 686,824

[22] Filed: Jul. 22, 1996

Related U.S. Application Data

[63] Continuation of Ser. No. 417,098, Apr. 5, 1995, abandoned, which is a continuation of Ser. No. 7,096, Jan. 21, 1993, abandoned.

[51] Int. Cl.$^6$ .............................. G06F 7/04; H03G 3/20; G10L 3/00
[52] U.S. Cl. .................. 704/273; 340/825.31; 367/198; 381/110
[58] Field of Search ........................ 340/825.3, 825.31, 340/825.34; 367/198, 199; 307/117; 235/382; 382/118; 381/41, 42, 43, 110; 395/2.82

[56] References Cited

U.S. PATENT DOCUMENTS

| | | | |
|---|---|---|---|
| 3,893,073 | 7/1975 | Angello | 340/825.31 |
| 3,969,584 | 7/1976 | Miller et al. | 340/825.31 |
| 4,032,931 | 6/1977 | Haker | 340/825.3 |
| 4,333,090 | 6/1982 | Hirsch | 340/825.3 |
| 4,340,797 | 7/1982 | Takano et al. | 367/198 |
| 4,449,189 | 5/1984 | Feix et al. | 381/42 |
| 4,479,112 | 10/1984 | Hirsch | 340/825.31 |
| 4,502,048 | 2/1985 | Rehm | 340/825.31 |
| 4,644,326 | 2/1987 | Villalobos et al. | |
| 4,653,097 | 3/1987 | Watanabe et al. | 381/42 |
| 4,856,072 | 8/1989 | Schneider et al. | 340/825.31 |
| 4,870,686 | 9/1989 | Gerson et al. | 381/43 |
| 4,975,959 | 12/1990 | Benbassat | 381/41 |
| 5,027,406 | 6/1991 | Roberts et al. | 381/43 |
| 5,153,918 | 10/1992 | Tuai. | |
| 5,163,111 | 11/1992 | Baji et al. | |
| 5,222,152 | 6/1993 | Fishbine et al. | 340/825.34 |

Primary Examiner—Larry D. Donaghue
Assistant Examiner—Mark H. Rinehart
Attorney, Agent, or Firm—Blakely, Sokoloff, Taylor & Zafman LLP

[57] ABSTRACT

Speech actuated security devices and methods whereby a lock, or other security or access device, may be actuated by a speech input thereto, but without disclosure of the actual code where doing so to those hearing the code words spoken during use of the security device. The security device includes a microphone, a display for displaying a plurality of code elements, and a processor for controlling the display and analyzing the microphone signal to detect a proper sequence of code elements spoken by a user as detected by the microphone and to operate the security device in response thereto. The code elements are displayed on the display under processor control in various patterns. With the proper sequence of code elements for operation of the security device not being a preset sequence of code elements, but rather being the code elements which appear in each of a proper sequence of spatial code element positions in the pattern of code elements being displayed by making the code elements displayed in the pattern viewable only by the user during use of the security device. Hearing the code elements being spoken by the user conveys no information about the actual code as a spoken sequence which will operate the security device at any one time and will change for the next operation of the security device by the reassignment of the code elements to new spatial positions within the pattern of code elements in the display. Various embodiments and methods of operation thereof are disclosed.

41 Claims, 5 Drawing Sheets

SPEECH ACTIVATED SECURITY SYSTEMS AND METHODS

This is a continuation of application Ser. No. 08/417,098, filed Apr. 5, 1995, which was a continuation of application Ser. No. 08/007,096, filed Jan. 21, 1993, both now abandoned.

BACKGROUND OF THE INVENTION

1. Field of the Invention

The present invention relates to the field of high security locks and related security devices.

2. Prior Art

High security locks and similar security devices of various kinds are well-known in the prior art. One type of such lock of particular interest to the present invention is keyboard operated locks wherein users of the locks are provided a code which, when entered into the keyboard, will operate the same. Such codes may be lock dependent, essentially serving as a combination for the lock, may be user dependent, essentially identifying the user to the lock system, or may be a combination of lock and user dependent. An example of the first type of lock are locks controlling access to parts of a secure facility, whereas locks of the second type include those used as part of an automatic teller machine to enable function keys which allow one to withdraw money and conduct other transactions. In that regard, the words lock, locks and security devices as used herein are used in a general sense to denote a means for granting access to a place or enabling a function or an action which is otherwise disabled, such as the operation of a door latch or the withdrawal of funds in an automatic teller machine or other services, communication devices, computing devices, cash machines, point of sale terminals, etc., or alternatively, the disabling of something which is normally enabled, such as might be required to lock or disable something normally left unlocked or enabled.

In a conventional keyboard operated lock, the level of security attained is relatively low because the number to key assignments are fixed and ordered, and the sequence of key depressions of a user are normally observable from either side of the user without substantial difficulty. To alleviate this problem and enhance the security of the overall system, keyboards are known wherein the keys are not given a predetermined and ordered 1-2-3 type sequence, but rather are given identifications just prior to use which identifications are effectively scrambled before the next such use. In this manner the physical key depression sequence observed during one operation of the system will have no meaning during the next operation of the system when the keys are identified differently. Further, in such systems the key identifications appearing when the user is standing in front of the keyboard are highly directional, and not observable from the side. Thus, the body of the user blocks the key identifications from view by others, so that while the physical key depressions can be observed from the side, the key identifications associated therewith cannot similarly be determined. Apparatus of this general type is disclosed in U.S. Pat. Nos. 4,644,326, 4,479,112, 4,333,090 and 4,502,048. Also, another device having security features which include physical screening as well as mechanical and electronic realignment of numeric key entry functions is disclosed in U.S. Pat. No. 4,032,931.

Apparatus of the foregoing type provides a high level of security, as no information concerning the code for operating the lock, which may be personal to a specific user, is conveyed to an interloper watching the sequence of key depressions used to operate the security device unless the interloper could somehow simultaneously view and record or memorize the code element pattern being displayed in association with the keys. However, such a security device is relatively expensive, primarily because of the mechanical complexity of the manually operable keys, the preferred positioning of each display device for the code elements behind each key, and the structure for reliably and substantially completely limiting the viewability of the display to the user. Such a security device can exhibit less than maximum reliability because of the mechanical nature of the basic input to the device. The keyboard, requiring manual operation, is quite limited regarding minimum allowable size because of the need for a user, perhaps a large man, to conveniently depress one key at a time with his finger. Also the keyboard, used by all persons, may be considered by some to be unacceptably unsanitary, and of course, because of the basic mechanical input requirements thereto, cannot be operated by one having their hands full without setting things down to operate the security device. Furthermore, a person with a physical disability affecting the use of their digits or without digits or hands cannot use such a device.

Thus, it would be desirable to provide a new security device which would maintain or even enhance the level of security achieved by the hereinbefore described devices, but in a manner eliminating the mechanical complexity and resulting lower reliability thereof while at the same time allowing for a smaller and substantially less expensive security device.

BRIEF SUMMARY OF THE INVENTION

Speech actuated security devices and methods whereby a lock, or other security or access device, may be actuated by a speech input thereto, but without disclosure of the actual code where doing so to those hearing the words during use of the security device. The security device includes a microphone, a display for displaying a plurality of code elements, and a processor for controlling the display and analyzing the microphone signal to detect a proper sequence of code elements spoken by a user as detected by the microphone and to operate the security device in response thereto. The code elements are displayed on the display under processor control in various patterns. With the proper sequence of code elements for operation of the security device not being a preset sequence of code elements, but rather being the code elements which appear in each of a proper sequence of spatial code element positions in the pattern of code elements being displayed by making the code elements displayed in the pattern viewable only by the user during use of the security device. Hearing the code elements being spoken by the user conveys no information about the actual code as a spoken sequence which will operate the security device at any one time and will change for the next operation of the security device by the reassignment of the code elements to new spatial positions within the pattern of code elements in the display. Various embodiments and methods of operation thereof are disclosed.

DETAILED DESCRIPTION OF THE INVENTION

Figure 1:
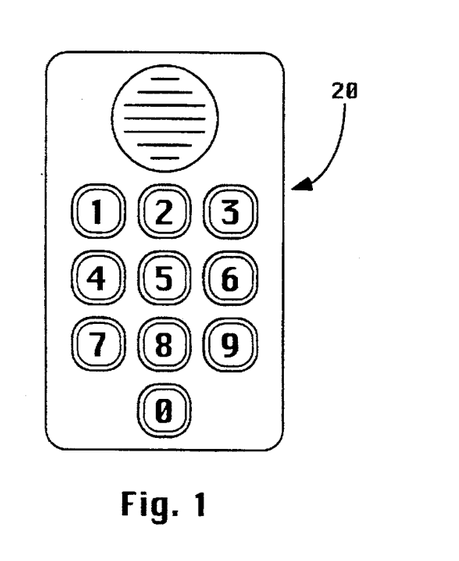
FIG. 1 is a face view of one embodiment security device in accordance with the present invention.

First referring to FIG. 1, a face view of one embodiment security device in accordance with the present invention may be seen. In particular, security device 20, which in a controlled entry facility may be mounted on a door or adjacent a door for controlled access, is characterized by an armored enclosure 22 having a microphone pickup 24 and ten code element display positions thereunder, each shrouded by an appropriate shroud 24 and/or covered by an appropriate slatted baffle so as to be viewable only through a narrow range of angles, particularly in the horizontal plane, so that an operator aligned with the display for proper viewing thereof will physically prevent similar viewing by an interloper therebehind by the presence of the user's body. In that regard, methods and apparatus for limiting the viewing angle of a display are well known. See for instance the disclosure of U.S Pat. No. 4,479,112.

For convenience, in the embodiment of FIG. 1, the code element positions are arranged in a two dimensional spatial pattern duplicating the arrangement of digits on a push button telephone. Such an arrangement will be immediately familiar to substantially any security device user, and accordingly is convenient to use, though as shall subsequently be seen, other arrangements and/or other numbers of code elements, as well as code elements of other forms or characters commonly recognizable or arbitrary in appearance may be used as desired.

As may be seen in FIG. 1, the code element positions are numbered in the Figure in accordance with the push buttons on a telephone, such as on Touch Tone telephones and the like, as a number associated with each such position will be immediately familiar to users of the security device. However, it is to be noted that such numbering is for the purposes of the description herein, and does not physically exist on the actual security device 20. Instead, in the quiescent state, the security device 20 appears as shown in FIG. 2, specifically as having the armored enclosure 22, a microphone pickup 24 and ten display locations 26, each surrounded by an appropriate shroud 28 for viewing only by the user, each display spatial location 26 being capable of displaying, by way of a seven segment LED display, a liquid crystal display, an incandescent display, a hidden display, a holographic display, a heads up display, a CRT display or otherwise, any one of the ten digits 0 through 9 at any one time, but with the display locations not having any numbering, specifically any ordered numbering associated therewith.

Figure 2:
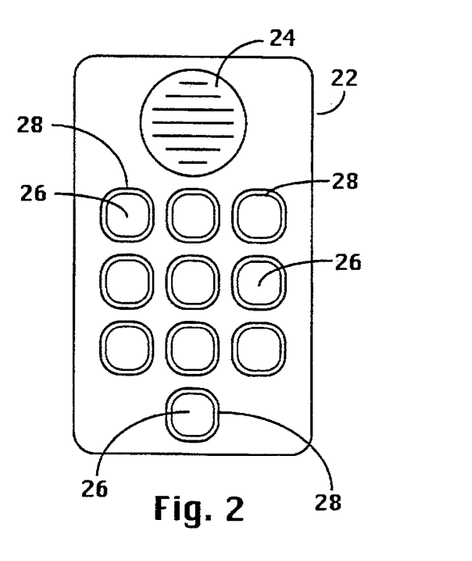
FIG. 2 is a face view of the security device of FIG. 1 in the quiescent state.

In the preferred embodiment, FIG. 2 represents the quiescent state of the security device, namely with the display off and, particularly if battery operated, with the processor in a low power or sleep mode awaiting an input to activate the same (a block diagram of the processor and support circuitry will be specifically described later). Accordingly, when in this quiescent state, the security device 20 must be activated to proceed with an operating cycle. For this purpose, a push button switch or other mechanical activation could be provided, though one of the advantages of the preferred embodiment of the present invention is complete hands free operation of the security device. Accordingly, in the preferred embodiment, a user will say some initiating word with a sufficient volume (microphone signal intensity being aided by the fact that the user or operator is in close proximity to the security device at that time) to be detected. Such activating word or noise will activate the system so that the processor may thereafter analyze the signal to detect the words spoken by the security device user (the words being limited to a relatively small vocabulary, including in this embodiment the digits 0 through 9). By way of specific example, in one embodiment a user might approach the security device and say the word "start", which word is sufficiently abrupt and short as to represent a readily detectable departure from background noise to activate the system. The system might be designed to turn on immediately and to catch enough of the word "start" to detect the same, though more likely the mere change in volume due to the spoken word "start" would simply activate the system in readiness to detect and interpret further spoken words picked up by the microphone.

Note that the system of the present invention being described is based upon principles of speech recognition as opposed to voice recognition. More specifically, in the embodiment being described, the system will detect and recognize any of the digits 0 through 9 as well as generally a very limited additional vocabulary, such as, by way of example, "start", "send", "end", "program" etc., regardless of the specific voice used. In that regard, the present invention security devices and systems may be used alone or together with other forms of security, such as by way of example, a card reader, biological sensors of some kind such as a fingerprint sensor, eye separation detector, photo recording and/or verification or other facial or facial feature recognition (automatic or through a remotely located security officer), etc., or even some level of voice recognition. However, except for its possible auxiliary application with the present invention, the invention being disclosed and described is based in the first instance on speech recognition rather than voice recognition.

Speech recognition is a technology which is currently under development, though clearly has currently reached a useful state of development for the present invention. In particular, accurate speech recognition in real-time for ordinary conversation with a substantially full vocabulary, particularly at a reasonable cost, is still to be desired. In such applications, the tendency of a speaker to string words together, similar pronunciations of different words, and of course the very large base vocabulary all compound the problem. However, in systems such as the present invention, a very limited vocabulary tends to eliminate the need for fine distinctions in recognition and the need for any look-ahead or look back capability to figure out a questionable word. Also the relatively short code and command sets being used with the present invention allow a user to pronounce the same with more clarity and demarcation between words than in ordinary speech. Further, because the command and code set being spoken at any one time is relatively short, analysis of the speech data may be done either substantially in real-time as it is received or alternatively after the complete command and code has been received, providing that the delay is only a very few seconds or less. Finally, in the present invention an error in speech recognition (for instance misinterpreting a spoken four for a five or a spoken six for a seven) is by no means fatal, as typically the device of the present invention will be programmed to allow some number of tries by a user before locking the user out for some period of time to prevent the user from systematically trying all possible codes. Thus an error in the system incurred during a user's first attempt to enter a valid spoken code will merely alert the user to be a little more careful in his next attempted verbal entry of his spatial code pattern.

Figure 3:
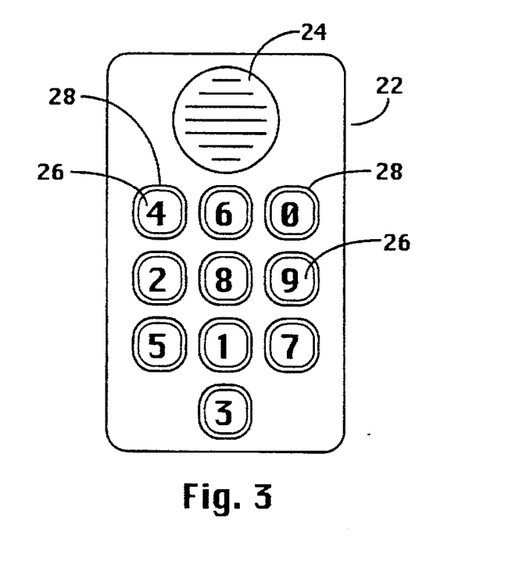
FIG. 3 is a face view of the security device of FIGS. 1 and 2 as displaying the digits 0 through 9 in a scrambled order.

Continuing with the description of the operation of the embodiment being described, when the user stands before the security device 20 and says "start", the processor therein will cause the displays to display the digits 0 through 9 in a scrambled order, a typical scrambling being shown in FIG. 3. This scrambled order may be a random order, a pseudo random order or one of a large plurality of scrambled orders, stored for instance in a look-up table or generated by an algorithm, perhaps representing more or less than all the possible orders of the ten digits. In that regard, the total number of possible two-dimensional spatial patterns or orders of digits is 10! (ten factorial) or 3,628,800, which may be more than one might choose to use in any particular environment (see subsequent discussion). In any event, once the scrambled digits are displayed for this embodiment, the user then recites or pronounces the characters which appear in a pre-determined sequence of code element spatial positions within the spatial pattern of code elements. By way of example, suppose one has a code corresponding first to the 2nd code element position (see FIG. 1 for spatial reference), then the 3rd code element position, the 8th, the 6th, the 7th, and finally the 4th code element position (using the spatial position numbering system of FIG. 1 the spatial position sequence would be 238,674). The user of the security device, rather than reciting 2-3-8-6-7-4, recites instead the numbers appearing in the positions 2-3-8-6-7-4, namely 6-0-1-9-5-2 in FIG. 3, in this embodiment followed by the word "end". (The use of the word "end" is arbitrary and unnecessary to require if fixed length codes are used.) The processor, as a result of the speech recognition, responds to the input of the verbal sequence 6-0-1-9-5-2 by converting the verbal sequence back to the code element position spatial sequence, recognizes that the code element spatial sequence is or is not a valid code, and responds accordingly, taking appropriate action such as actuating a lock if the code is valid, or if the code is invalid, somehow indicating the same by fault indicating buzzer, voice playback of "code invalid", activating an LCD or similar display, etc., and enabling a limited number of additional tries before deactivating the system for some period of time and/or communicating to a remote location the fact that repeated, unsuccessful attempts to enter a valid code have been made.

Upon the next activation of the system, the position of the digits will again be scrambled so that the spoken code 6-0-1-9-5-2 previously received as a valid code and perhaps heard by an interloper is no longer valid. In that regard, if everyone uses a single spatial sequence as the only valid code, then any substantial scrambling will achieve the desired result.

The system could, of course, scramble the spatial pattern of code elements after each spoken code element entry, although this is not preferred as it would slow the system down as well as slow down the users' entry of the code with no apparent improvement in security. On the other hand, the presentation of the code elements should be scrambled for each operation of the security device, as otherwise a spoken digit sequence corresponding to a valid spatial position sequence of code elements operating the security device one time will again immediately be usable on the next subsequent use of the security device.

Figure 4:
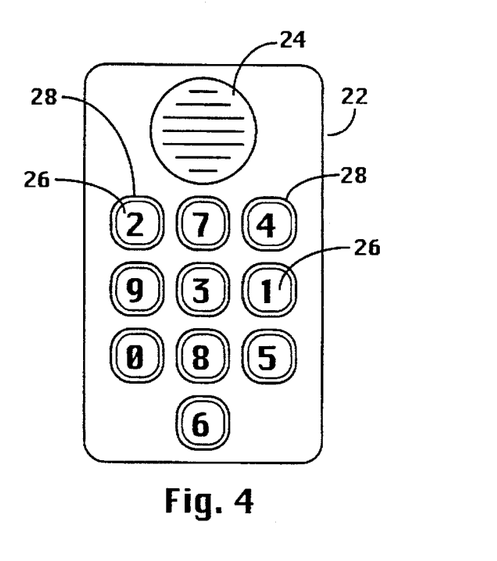
FIG. 4 is a face view of the security device of FIGS. 1, 2 and 3 as displaying the digits 0 through 9 in a different scrambled order after that of FIG. 3.
Figure 5:
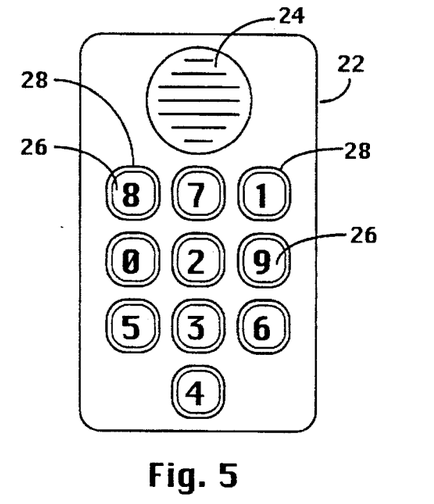
FIG. 5 is a face view of the security device of FIGS. 1, 2 and 3 as displaying the digits 0 through 9 in an alternate next scrambled order after that of FIG. 3.

After the spatial presentation of code elements shown in FIG. 3, the next scrambled presentation may be, by way of example, such as is shown in FIG. 4, or alternatively, such as shown in FIG. 5. In particular, the scrambling of FIG. 4 in comparison to that of FIG. 3 represents one of many possible arbitrary scramblings wherein the spatial position of every code element of FIG. 3 has been changed. On the other hand, if the scrambling for the subsequent use after that of FIG. 3 is in accordance with that of FIG. 5, then the spatial position of some, but not all, code elements has been changed. Specifically eight of the ten have been changed, with the spatial position of code elements five and nine not being changed. Similarly, the change from FIG. 4 to FIG. 5 represents a change in spatial position of nine of the ten code elements, the spatial position of code element seven not being changed. Thus, as desired, one may allow some repetition of code element positions between scramblings or alternatively disallow such spatial position repetition. By way of example, if the scramblings are achieved by some substantially random scrambling, a comparison of a new code element spatial position pattern with the previously used pattern may be made before the display is actually turned on, and the pattern re-scrambled if necessary until each code element spatial position has been changed from that previously used. Scrambling preferably is done between operations of the lock, but may be done at other intervals such as, by way of example, after each code element entry. Also, the range of displayable code element patterns does not have to include all theoretically possible displayable patterns, but instead may merely be a subset of the full range of possibilities.

Figure 6:
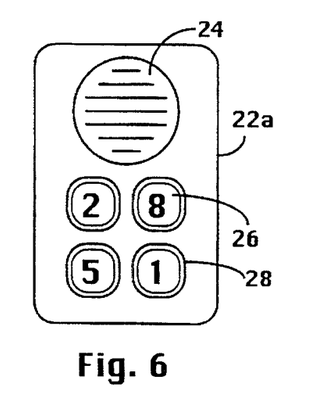
FIG. 6 is a face view of a still further embodiment of the invention.

Now referring to FIG. 6, a still further embodiment of the invention may be seen. This embodiment is the same in concept as the embodiment hereinbefore described. In particular, it includes an armored case 22a having a microphone 24 and a plurality of displays, each for displaying any one of the ten digits 0 through 9. However, unlike the previously described embodiment, the embodiment shown in FIG. 6 has the capability of only displaying four code elements at a time, again in a two dimensional spatial arrangement. Thus, the number of code elements which may be displayed at any one time is substantially less than the total population of possible code elements. However, as before, a valid code is determined by a user reciting the code element digits in a sequence corresponding to a valid code element spatial position sequence. Accordingly, in this embodiment it doesn't matter what four of the ten digits are displayed for any code element spatial position input, or whether the four displayed code elements are re-selected between each code element spatial position input, though it is of course important that as a minimum, the code elements displayed be re-selected or at least scrambled between successive operations of the lock. Assuming codes are not personalized so that each user of the lock will use the same code, any code element entry will have one chance in four of being correct. Thus for a five spatial position sequence code, there would be 1 chance in 1,024 that random operation of the lock would be successful, or for a 7 digit code 1 chance in 16,384 for a random input of a sequence of the seven code element positions would be successful. Thus, in general, unless a particularly long code element spatial position sequence were used, an embodiment such as shown in FIG. 6 would generally be of lesser security and probably not as well suited to the use of personalized codes than the hereinbefore described embodiment, although there are other advantages useful in certain applications. In particular, it should be less expensive, it should be easier for children to use, for a given total display area the code elements displayed may be larger for sight impaired people, or alternatively the total display area may be made considerably smaller, not only making the same less expensive but also making it easier to shield the display from view by an interloper when the lock is being used. In that regard, the display for an embodiment such as that shown in FIG. 6 (though in the other embodiments also) could easily be a small single display device such as by way of example, a back lighted liquid crystal display, with the entire display area shrouded and/or baffled to prevent viewing from the side. Normal viewing of the display only by the user can also be provided by using a peep hole for viewing a small display within the unit, perhaps through a magnifying eyepiece.

Figure 7:
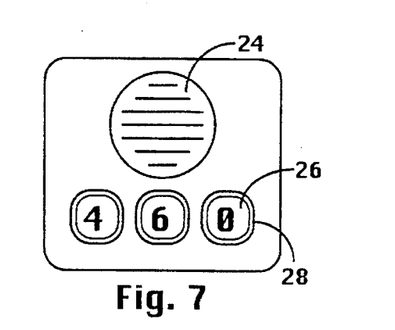
FIG. 7 is a face view of a further embodiment using a horizontal linear or one-dimensional array of code elements.
Figure 8:
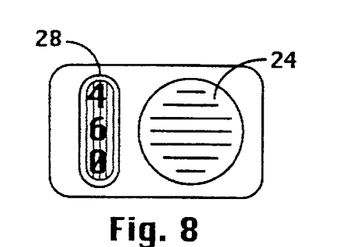
FIG. 8 is a face view of a further embodiment using a vertical linear or one-dimensional array of code elements.
Figure 11:
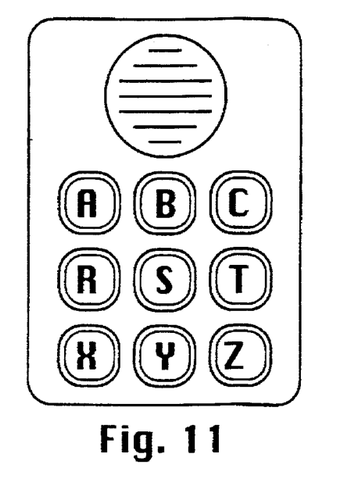
FIG. 11 is a face view of a further embodiment of the present invention utilizing letters as code elements the position of which will be scrambled for each operation of the lock.
Figure 12:
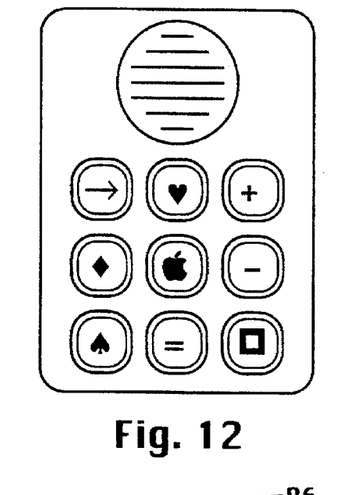
FIG. 12 is an embodiment similar to that of FIG. 11 utilizing symbols or objects as code elements rather than numbers or letters.
Figure 13:
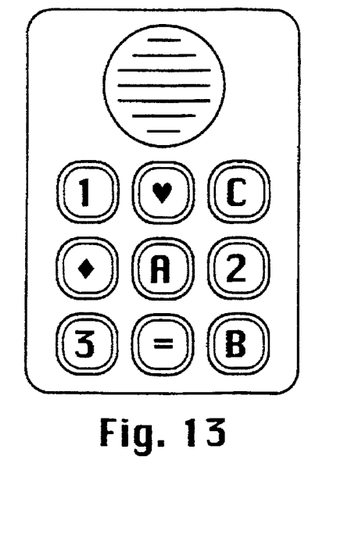
FIG. 13 is an embodiment similar to that of FIGS. 11 and 12 though illustrating the use of a combination of letters, numbers and symbols.

In the embodiments herein before described, a two-dimensional spatial pattern of code elements has been used. In the embodiment of FIG. 7 however, a linear or one-dimensional array of code elements is used, the security device otherwise functioning as herein before described, particularly with respect to the embodiment of FIG. 6. While the one-dimensional spatial display would be difficult to package and use if ten code element positions were displayed at one time, if the number of code elements displayed at one time is relatively low, such as three in the embodiment of FIG. 7, the display may be a short one line display quite small and easily shrouded and/or baffled to provide the highly limited viewing angle. Obviously of course, such a linear display of code elements may be arranged vertically rather than horizontally, the vertical arrangement perhaps being even easier to limit in sidewise viewing angle by baffles as illustrated in FIG. 8. Of course in any embodiment of the present invention, other code element forms may be used if desired, such as by way of example, letters as illustrated in FIG. 11, graphic symbols such as shown in FIG. 12 which could be selected for particular ease in remembering by children and/or distinctiveness with respect to each other for particular ease of speech recognition, or even mixtures of letters, numbers and symbols such as in FIG. 13.

Figure 9:
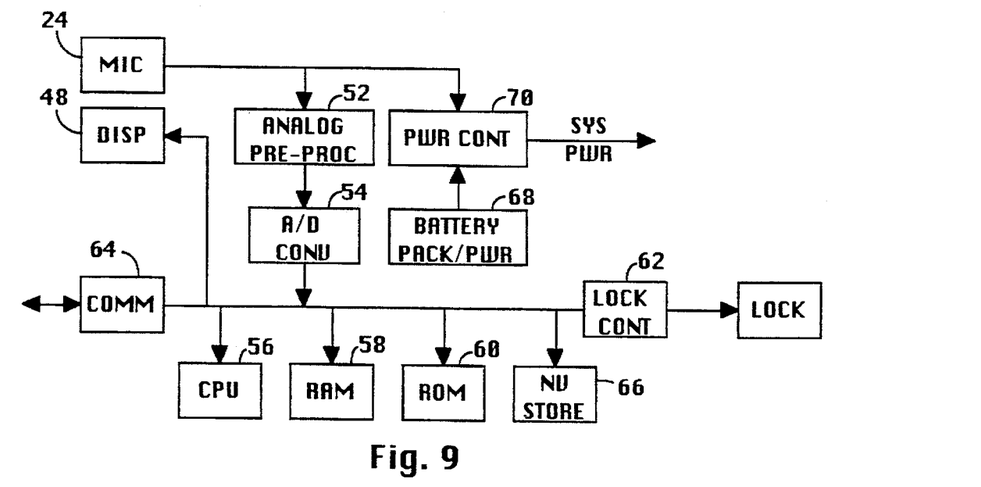
FIG. 9 presents a block diagram of a representative electronic control for the present invention.

Now referring to FIG. 9, a block diagram for the electronic control of the present invention may be seen. As shown therein, microphone 24 provides a microphone signal to an analog preprocessing circuit 52 which in turn is coupled to analog to digital (A/D) converters 54 coupled to the bus of a microcomputer comprising a central processing (CPU) unit 56, random access memory (RAM) 58 and read only memory (ROM) 60, the microcomputer itself controlling the display 48. The analog preprocessing circuit 52 may take many forms depending on the details of the specific speech recognition technique used. By way of example, in its simplest form, the analog preprocessing circuit 52 may be a band pass filter to simply limit the frequency range of the microphone signal to the range of intelligible information in male and female voices. In such case, a single A/D converter is used to provide digital samples of the speech to the microcomputer for analysis for speech recognition purposes using an algorithm stored in ROM 60. In another form, the analog preprocessing circuit 52 may be a plurality of band pass filters to provide a plurality of signals, each limited to one of a plurality of frequency ranges of the microphone signal within the range of intelligible information in male and female voices. In such case, a plurality of A/D converters are used, each to provide digital samples of the respective band limited speech to the microcomputer for analysis for speech recognition purposes using an algorithm stored in ROM 60. In any case, details of current speech recognition techniques may be found in many published sources, and accordingly need not be given in detail herein. In that regard, clearly speech recognition technology has progressed so as to be more than adequate for use with the present invention, as the limited vocabulary, lack of need for truly real-time recognition and the ability to retry on error grossly simplifies the recognition task over other applications for voice recognition.

Upon recognition of a valid code, the microcomputer will provide a control signal to a lock control circuit 62 which in turn unlocks the lock such as by way of example, by electromagnetic control of the striker plate. If the lock is part of a larger security system, the same may also have a communications capability by way of communications interface 64 for reporting (encrypted or not, hardwired, radio, infrared link, etc.) the lock actuation or an unsuccessful attempt to actuate the lock to a central system, for identifying the user if the codes are user dependent or user class dependent, and perhaps for reporting tampering if the same has means for sensing tampering. Such communication capability may be bi-directional so that codes may be changed, new codes for new users added, etc. from a remote location. For this purpose, the system may further include an electrically alterable non-volatile memory 66 wherein the codes themselves are stored rather than storing the same in ROM.

For a typical consumer application, such as an external residential door lock, the same may be battery powered, self powered through solar or other energy input forms, or alternatively, powered from 115 VAC power, such as through a low voltage DC converter. Typical commercial systems will be generally powered from 115 VAC power. In any event, even if powered from 115 VAC power, it is desirable to have battery backup so that upon loss of 115 VAC power, the system will operate on batteries for a very substantial length of time. For this purpose, a battery pack 68, which can be a rechargeable battery pack, particularly if the lock is normally powered from 115 VAC power, is provided. To prolong battery life, a power control 70 may be provided which monitors the microphone output utilizing a very low power circuit to either turn on system power or wake up the microcomputer from a sleep mode upon a change in background noise which may represent an attempt to operate the lock system. Because the duty cycle of substantially any lock is very low, battery life can be maintained very high in this manner.

Figure 10:
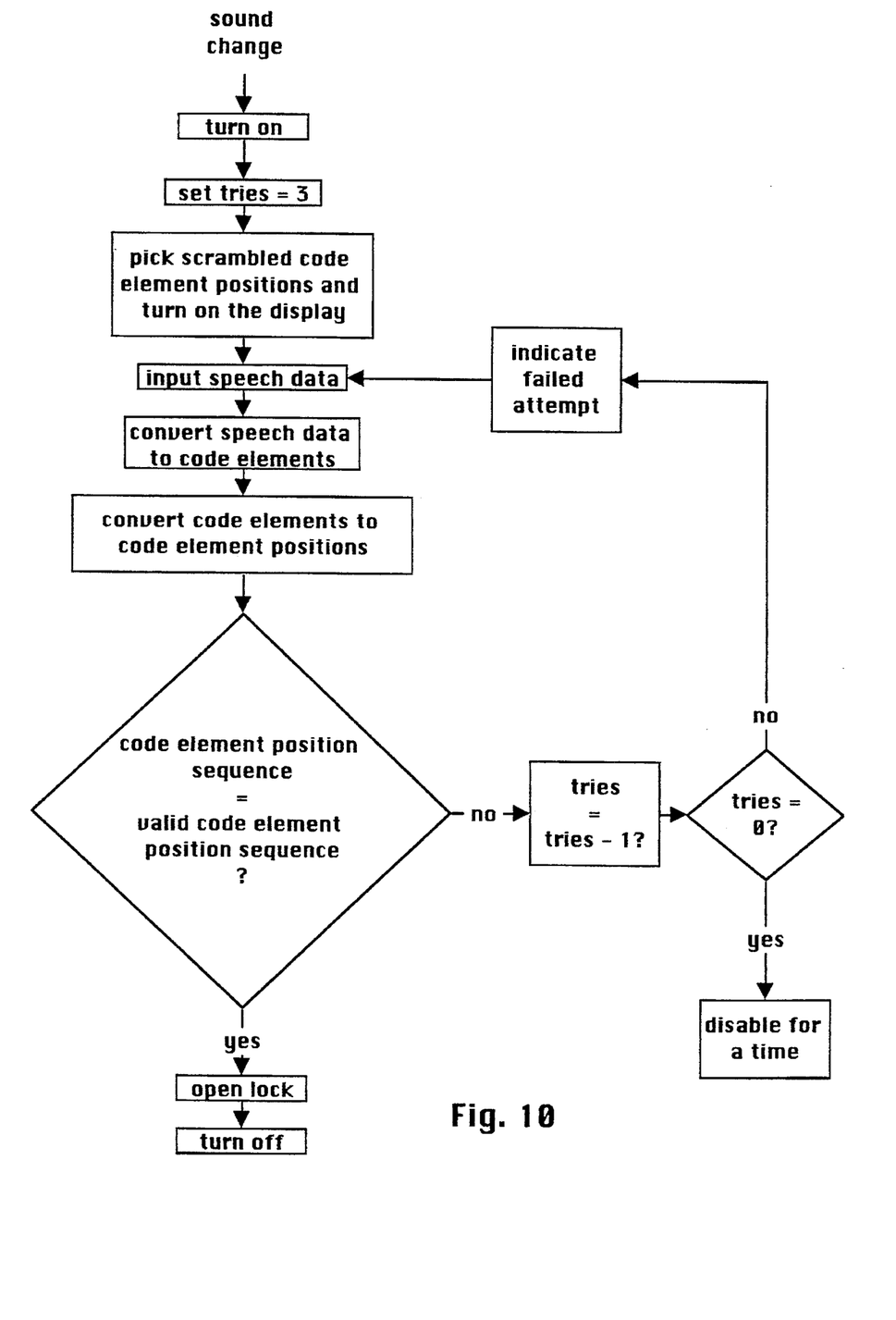
FIG. 10 presents a representative flow diagram for the operation of the lock.
Figure 15:
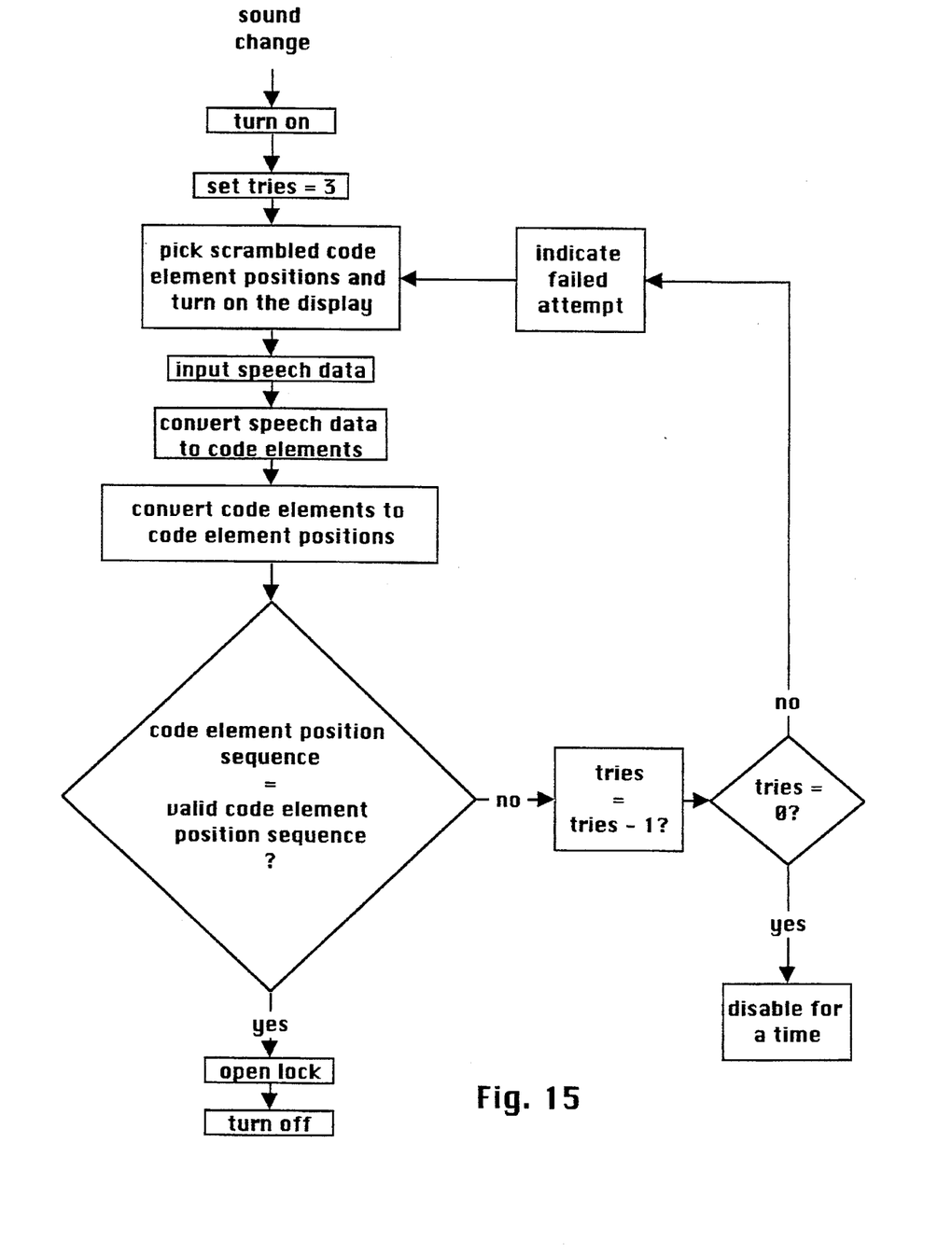
FIG. 15 presents an alternate to the representative flow diagram of FIG. 10 for the operation of the lock.

Now referring to FIG. 10, a representative flow diagram for the operation of the lock may be seen. As shown in that Figure, a change in sound level activates the system, causing the same to set the number of allowable tries to 3, to pick a scrambled spatial arrangement of code elements and to display the same in readiness for the speech input. In the flow diagram shown, the speech data is first input and then converted to code elements, though as stated before, this could also be done in real-time in one operation. Once the inputted code elements are known, the code element sequence is converted to a code element position sequence using the applicable scrambling as a reference. Then the code element position sequence is compared with the valid code element position sequence or sequences to determine if the lock is to be operated. Note that the valid code element position sequence or sequences may be stored locally in the lock, or in systems having a communication capability, may alternatively be stored, updated etc. in a remote location, whereby the comparison may be done at the remote location for communication of the result to the lock. In that regard, the entire lock operation may be remotely monitored and/or controlled if desired. In any event, if the spoken code elements are in a valid code element position sequence, the lock is opened and the system shut down in readiness to be reactivated at any time. If the spoken code elements are not in a valid code element position sequence, the lock is not opened, but instead the "tries" flag is decremented, and if now zero, the system is disabled for a period of time to prevent continuous retrying until successful. If the "tries" flag is not zero, the failed attempt to operate the lock is indicated to the user visibly and/or audibly, and the system is reset to receive another attempted speech input. In FIG. 10, the next attempt is with the same scrambling of the code elements, whereas in FIG. 15, the code element positions are rescrambled for the next try. Obviously the system would include a "time out" capability so that if initiated by a loud noise, the same will automatically shut down if speech inputs are not received within a very few seconds.

In the embodiments herein before described, operation or at least the primary mode of operation was described as being by way of speech operation, which might be augmented with other security measures such as some form of biological testing, etc. As an alternative, any of the embodiments of FIGS. 1 through 14 may include a switch element at each code element location. This would allow manual operation of the device by actuating the switches in the order of a predetermined sequence of code elements based upon the scrambled display either as an alternate form of operating the device or alternatively as a required input in addition to a spoken sequence of code elements for additional security purposes. Such switch actuated devices are well known, having been manufactured and sold by the Assignee of the present invention for a number of years. The combined capability has a number of advantages, including the use of the lock of the present invention in a manner identical to the prior art Hirsch Electronics locks by those not desiring to change as well as the use of the locks of the present invention by speech actuation by those not familiar with the prior art Hirsch Electronics locks and/or more comfortable with speech actuation, and particularly to facilitate operation of such a lock by those having physical impairments of either a permanent nature or temporary nature such as a recent injury or even merely having one's hands full at a time. Obviously of course, the speech actuation of a device used to enable access to a location may be combined with an automatic door opening system so as to provide full access without any form of manual operation.

Also in the embodiments herein before described, the code elements are entered through spoken word whether the words are an identification of letters, numerals or of symbols or any combination thereof. In that regard, one need not always use a fixed set of code elements but instead the code elements themselves could vary from time to time or alternatively could vary depending upon the user, such as by way of example, as determined by the particular word used to initiate operation of the device. For instance, adults might initiate operation using the word "start" after which a scrambled form of numbers or letters would be presented for lock operation whereas children might initiate operation with the word "begin" after which a scrambled arrangement of toys or animal forms might be presented so that the code element positions to operate the lock at a particular time might be the sequence "cat-dog-bear-duck-squirrel." Further if desired, one could readily make other alterations in the programming of the system so as to simulate in speech actuation operation of prior art manually operated locks. By way of specific example, one could readily duplicate in a speech operated lock the basic operation of a safe or combination lock so that the speech actuated lock could be actuated by "speaking the operation" such as left to 7, right 7,8, left 9,1 open. In any of the embodiments, the speech operated device could readily be programmed to recognize multiple languages so as to be multilingual in receiving and interpreting the spoken word inputs to the device.

If unique words were used to start and end the code element entry sequence, then the same makes initiation by the speech actuated system more difficult to the interloper as well as provide the opportunity to identify the user by individual or group or even by language and to identify other criteria such as the day of the week, etc. It also facilitates, or better facilitates, the use of variable length code element sequences if desired.

Figure 14:
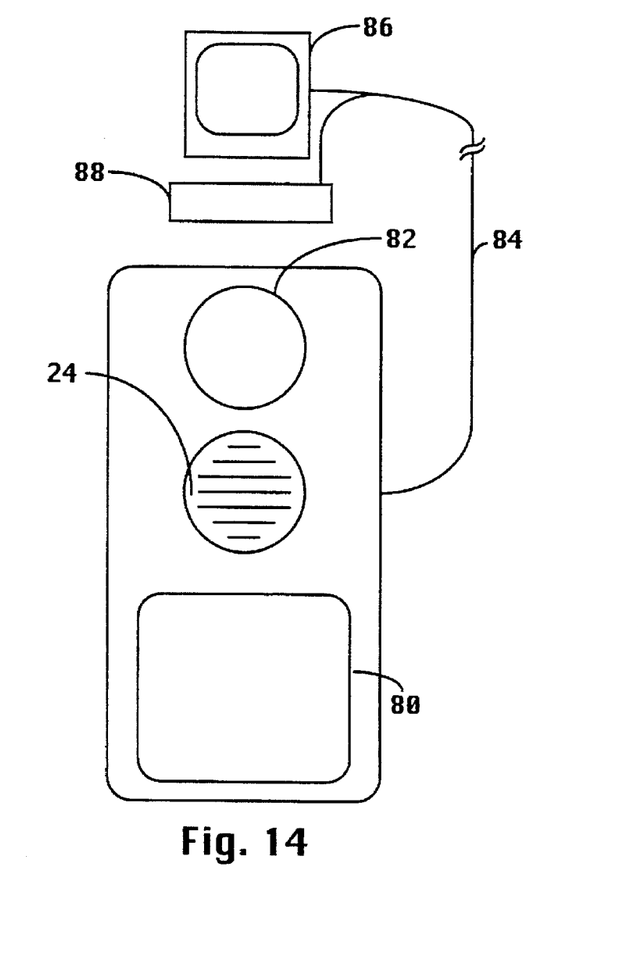
FIG. 14 is a face view of an embodiment of the present invention utilizing a display screen which may be a touch screen for verbal or manual entry of code element positions or code elements and further including a video camera for displaying recording and/or analyzing the image of a user of the lock typically upon successful or unsuccessful operation of the lock or both.

Now referring to FIG. 14, a still further embodiment of the present invention may be seen. This embodiment includes the speech input microphone 24 and a display 80 for displaying the code elements in a scrambled form. The display 80 could conveniently be the standard 80 column by 25 line personal computer display to provide compatibility with PC based system. Also if desired, the screen can also be a touch sensitive screen again, facilitating manual operation instead of speech operation if desired. Such a system would be operable not only for entry of a person's PIN number (personal identification number) either by touching the screen in a sequence of positions corresponding to the scrambled position of the corresponding PIN number (personal identification number) sequence, or alternatively speaking numbers corresponding to the individual's code element position sequence, but also to step through the various aspects of the particular transaction (deposit, withdrawal, transfer, etc.). The embodiment of FIG. 14 also includes a small video camera 82 connected through line 84 or a wireless link to a remote location which may include a monitor 86 and/or a recording device 88. A commercially available video camera may be used as video camera 82. Monitor 86 of course would allow a security officer at a central or remote location to monitor a relatively large number of locks particularly during non-normal business hours by having the image of the operator of the lock appear on the monitor only after an attempted lock operation, successful or unsuccessful. Similarly, recording device 88 may be operative to record the image of the lock user after successful operations of the lock, after unsuccessful operations of the lock or both as desired. Alternatively, device 88 could be a facial image recognition device dedicated to a particular lock or more likely time shared by a relatively large number of locks so as to provide at least a coarse recognition of the lock user based upon a stored library of images of authorized users. (See Computer Oriented Approaches to Pattern Recognitionby William S. Meisel, Academic Press, 1972.) Finally of course, in any of the speech actuated locks in accordance with the present invention, the system may be provided with the capability of detecting duress in the voice of the user or alternatively by providing some form of embedded code known only to the user to allow the user to convey a non-voluntary operation of the lock so as to provide for automatic summoning of aid, with or without operation of the lock as may be appropriate to the circumstances and the safety of the person under duress. By way of specific example, in an embodiment such as shown in FIG. 12, the code for operating the lock might be a five-position sequence of code element positions such as upper right corner, left column center, lower right corner, upper row center and left column lower corner for operation of the lock in the normal manner. By changing the third position to another predetermined position such as by way of example, to the lower row center position, operation of the lock may be provided but at the same time, aid automatically summoned through a silent alarm to provide the required assistance to the user. Any other code element position sequence spoken by a user or attempted user would merely result in non-operation of the lock, unless of course, specific other sequences coincided with valid code element position sequences assigned to other users.

Finally, one could use code elements that are arbitrary and not generally known or pronounced, or code elements that are generally known but given new verbal definitions or pronunciations not generally associated therewith. In this case, while a user would have to learn the definitions or pronunciations, an interloper both seeing and hearing the operation of the lock would still not gain information enabling him to operate the same at a later time. In this regard the system could include a teaching or programming mode not only for entering new valid position sequences, but also for learning the arbitrary definitions or pronunciations of each code symbol as the user chooses to define and as the code symbols are presented for this purpose. By way of specific example, at least one code symbol position sequence stored in step (a), for example, the code symbols might be 0, 1, 2, 3, 4, etc. but pronounced star, box, foot, F, no, etc.

While the preferred embodiment and certain alternate embodiments of the present invention have been disclosed and described herein, it will be obvious to those skilled in the art that various other changes in form and detail may be made therein without departing from the spirit and scope of the invention.

I claim:

1. A speech activated device comprising:
  display means for visually displaying to a user of said device a plurality of code symbols, each in one of a plurality of spatial positions in a predetermined spatial pattern of code symbol positions, each of said code symbols having a predetermined pronunciation;
  means coupled to said display means for causing the display of said plurality of code symbols and for varying the position of at least some code symbols in the spatial pattern of code symbols;
  microphone means for generating microphone signals in response to a plurality of speech input commands that correlate to spatial code symbol positions of a sequence of code symbols;
  means for converting said microphone signals generated from said spoken spatial code symbol positions to code symbols and comparing said symbols to a valid code for a user of the device, and for providing an output signal in response thereto.

2. The speech activated device of claim 1 wherein said means coupled to said display means for causing the display of said plurality of code symbols and said means for analyzing said microphone signals includes a processor means.

3. The speech activated device of claim 1 wherein each of said code symbols and the pronunciation thereof is well known.

4. The speech activated device of claim 3 wherein said code symbols include at least some of the ten digits 0 through 9.

5. The speech activated device of claim 3 wherein said code symbols include at least some of the letters of an alphabet.

6. The speech activated device of claim 3 wherein said code symbols include at least some non-alphanumeric symbols.

7. The speech activated device of claim 1 wherein the pronunciation of each code symbol as used in conjunction with the device is arbitrary and not generally associated with the respective symbol.

8. The speech activated device of claim 1 wherein said display means is only visible to the user during normal operation.

9. The speech activated device of claim 1 further comprised of lock actuation means responsive to said output signal of said means for analyzing said microphone signals to actuate a lock in response thereto.

10. The speech activated device of claim 1 further comprising means coupled to said microphone means for activating said processor means upon detection of an activating sound, said processor means further being a means for responding thereto by causing the display of said plurality of code symbols, for analyzing said microphone signals to detect the occurrence of a user pronouncing code symbols in a verbal sequence corresponding to the code symbols then appearing in each spatial position of at least one predetermined sequence of spatial positions in said predetermined spatial pattern of code symbol positions within a predetermined period of time, for providing an output signal in response thereto only if said predetermined sequence of spatial positions in said spatial pattern of code symbol positions correspond to a valid code for a user of the device, and for deactivating said processor means if an invalid or incomplete code is detected.

11. The speech activated device of claim 10 wherein said processor means is a means for preventing operation of said speech activated device for a period of time upon successive activations without detecting a user's pronouncement of a valid code.

12. The speech activated device of claim 1 further comprised of communication means for communicating information on the use of said speech activated device to a remote location.

13. The speech activated device of claim 12 wherein each valid code further includes, in addition to said predetermined sequence of spatial positions in said spatial pattern of code symbol positions corresponding to a valid code, an additional code symbol, which code symbol may be varied by a user to indicate conditions such as operation of said speech activated device under duress, said processor means being a means for detecting the same and for causing said communication means to communicate such fact to the remote location.

14. The speech activated device of claim 1 wherein said processor means is a means for varying the position of all code symbols in the spatial pattern of code symbols upon each use of said device.

15. The speech activated device of claim 1 wherein said processor means is a means for varying the position of code symbols in the spatial pattern of code symbols upon each use of said device in a pseudo random manner.

16. The speech activated device of claim 1 wherein said processor means is a means for varying the position of code symbols in the spatial pattern of code symbols upon each use of said device in a substantially random manner.

17. The speech activated device of claim 1 wherein said processor means is a means for varying the position of code symbols in the spatial pattern of code symbols upon each use of said device, the total of all code symbol patterns displayable by said processor means in the spatial pattern of code symbols being less than the total of all possible code symbol patterns in the spatial pattern of code symbols.

18. The speech activated device of claim 1 further comprised of means for alternatively manually operating said device.

19. The speech activated device of claim 18 wherein said means for alternatively manually operating said device comprises a manually operable means, each associated with one of the code symbols as may be displayed in conjunction therewith.

20. The speech activated device of claim 1 further comprised of additional means for verifying the authorization of a user of the device.

21. The speech activated device of claim 20 wherein said additional means for verifying the authorization of a user of the device comprises a video camera and means for transmitting the video signal therefrom to a remote location.

22. The speech activated device of claim 20 wherein said additional means for verifying the authorization of a user of the device comprises means for recognizing the face of a user.

23. The speech activated device of claim 20 wherein said additional means for verifying the authorization of a user of the device comprises means for recognizing the voice of a user.

24. A method of operating a device comprising the steps of:

(a) providing a display that has plurality of spatial code symbol positions;

(b) displaying a plurality of code symbols in the display, the spatial code symbol position of each code symbol within the display being varied from time to time;

(c) sensing a series of speech input command that correlate to the spatial code symbol positions of a sequence of code symbols;

(d) converting the spoken spatial code symbol positions into code symbols; and, (e) comparing said code symbols with a valid code and, providing an output signal.

25. The method of operating a device of claim 24 wherein each of said code symbols and the pronunciation thereof is well known.

26. The method of operating a device of claim 24 wherein said code symbols include at least some of the ten digits 0 through 9.

27. The method of operating a device of claim 24 wherein said code symbols include at least some of the letters of an alphabet.

28. The method of operating a device of claim 24 wherein said code symbols include at least some non-alphanumeric symbols.

29. The method of operating a device of claim 24 wherein the pronunciation of each code symbol as used in conjunction with the device is arbitrary and not generally associated with the respective symbol.

30. The method of operating a device of claim 24 wherein the code symbols displayed are normally only visible to the user.

31. The method of operating a device of claim 24 further comprised of the step of actuating a lock in response to the output signal.

32. The method of operating a device of claim 24 further comprising the step of preventing operation of the device for a period of time upon repeated negative results of step (e).

33. The method of operating a device of claim 24 further comprising the step of communicating information on the execution of the method to a remote location.

34. The method of operating a device of claim 33 further comprising the step of sensing a spoken code symbol and communicating information indicated by the position of that code symbol to a remote location if the position of that code symbol is associated with abnormal conditions associated with the operation of the device.

35. The method of operating a device of claim 24 wherein the position of all code symbols in the spatial pattern of code symbols is varied upon each execution of the method.

36. The method of operating a device of claim 24 wherein the position of code symbols in the spatial pattern of code symbols is varied upon each execution of the method in a pseudo random manner.

37. The method of operating a device of claim 24 wherein the position of code symbols in the spatial pattern of code symbols is varied upon each execution of the method in a substantially random manner.

38. The method of operating a device of claim 24 wherein the total of all code symbol patterns displayable in the spatial pattern of code symbols is less than the total of all possible code symbol patterns in the spatial pattern of code symbols.

39. The method of operating a device of claim 24 further comprising the step of verifying the authorization of a user of the device.

40. The method of operating a device of claim 39 wherein the additional step of verifying the authorization of a user of the device includes the step of transmitting a video image of the operator of the device to a remote location.

41. The method of operating a device of claim 24 wherein in step (c), the series of spoken code symbols may be spoken and sensed in a plurality of languages.

* * * * *